Dec. 26, 1939.                    H. O. PETERSON                    2,184,754
MEASURING SHORT WAVE NOISE LEVELS
Filed Dec. 2, 1935
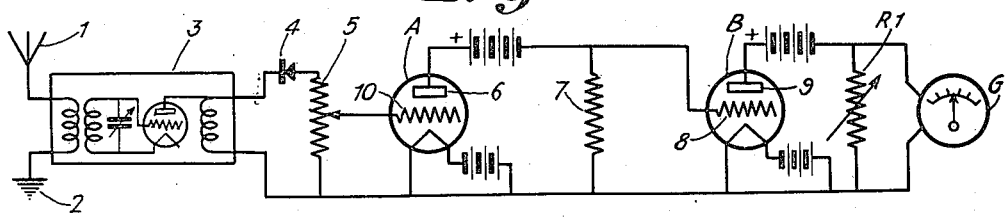
*Fig. 1*
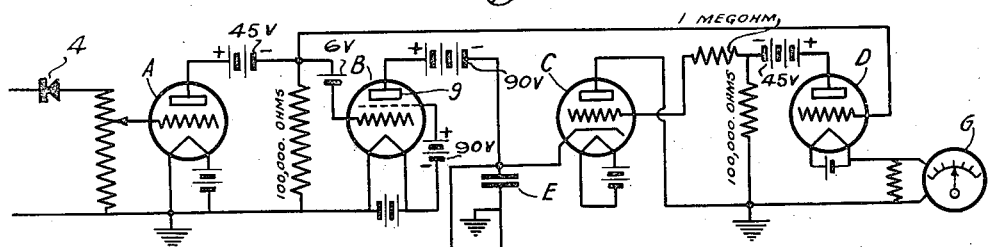
*Fig. 2*
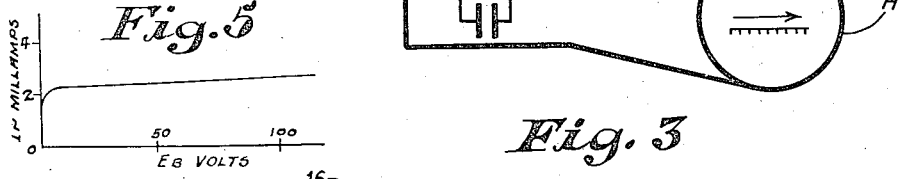
*Fig. 3*
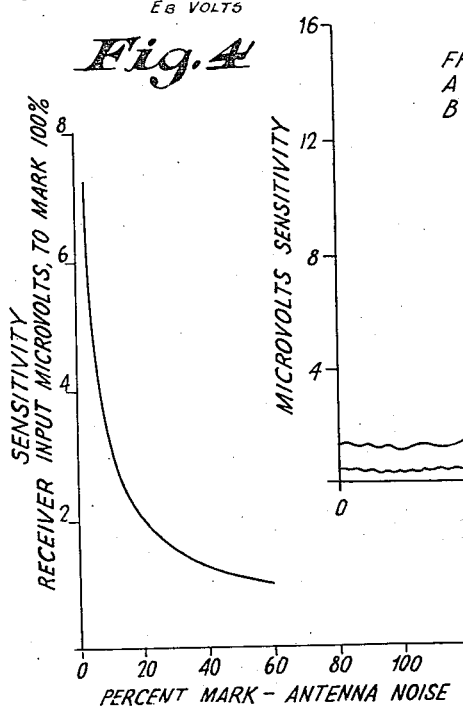
*Fig. 5*
*Fig. 4*
FREQUENCY = 18 M C.
A - 1.6 μV THRESHOLD
B   4.8 μV THRESHOLD
INVENTOR
HAROLD O. PETERSON
BY H. S. Grover
ATTORNEY Patented Dec. 26, 1939

2,184,754

UNITED STATES PATENT OFFICE 2,184,754

MEASURING SHORT WAVE NOISE LEVELS

Harold O. Peterson, Riverhead, N. Y., assignor to Radio Corporation of America, a corporation of Delaware Application December 2, 1935, Serial No. 52,465

5 Claims. (Cl. 178—69)

This invention relates to a new and novel method of measuring noise potential levels, particularly as related to radio communications.

The method described by this invention is essentially a means for continuously measuring the percentage of elapsed time that the noise potential level exceeds a certain desired predetermined voltage level. The predetermined voltage level may be made any level at which data is to be taken. The device consists of a grid biased tube circuit such that when input signal exceeds a certain level, the output tube passes a normal value of plate current through a ballistic meter of relatively slow period. If the input continuously exceeds the threshold level, the ballistic meter reads "100 percent." The data obtained is particularly useful in connection with the engineering of short wave radio telegraph circuits, since these are usually operated through vacuum tube relay devices at the receiving end, set to register normal output whenever the signal "marks" at any level above a controllable threshold value.

The general function of noise data is to enable a prediction to be made of the signal strength required to afford a given quality of service, or conversely, to enable prediction of the quality of service possible with a given signal level available. In nearly all cases of telegraphic communication, intelligence is transmitted by on-off keying of the transmitter carrier. The carrier is broken to form dots and dashes of full radiation separated by spaces of no radiation. Throughout this specification "carrier on" will be spoken of as "mark," and "carrier off" will be spoken of as "space." The durations of these elements of mark and space will be inversely proportional to the rate at which intelligence is transmitted.

Radio-frequency noise potential energy passing through the receiving system may cause a false "mark" to be registered where there should be "space," or may in some cases oppose the signal to cause "space" to appear where there should be a "mark." If these false elements are present, the speed of transmission may be slowed down to a rate at which the lengths of the shortest signaling elements are two or three times as long as the false elements. If the false elements are relatively long but occur infrequently, it will be preferable to transmit at a higher rate and send each word or message twice in succession. It accordingly follows that noise data, indicating the lengths and frequency of occurrence of false elements, will be useful in predicting the effects of noise on circuit quality.

The invention will be better understood by referring to the accompanying drawing, in which—

Fig. 1 is a circuit diagram of the measuring method;

Fig. 2 is a circuit diagram of another modification of Fig. 1;

Fig. 3 is a curve of voltage plotted against time; and

Fig. 4 is a curve of voltage plotted against the percent of noise.

Fig. 5 is a curve showing the characteristics of tube B of Fig. 2.

A device for indicating the percent of total time "mark," together with a means for measuring duration of false elements or for which noise produces false elements which are equivalent to a "mark," will therefore yield useful desired data. Fig. 1 shows a circuit which will indicate percent mark. The circuit comprises an antenna 1, ground 2, radio receiver 3, rectifier 4, and volume resistor 5. With no signal (space element) the plate 6 of tube A draws current through a resistor 7 so as to place a large negative bias on the grid 8 of tube B. For this condition the plate 9 of tube B draws zero plate current. Any value of rectified signal (mark element) above a certain desired value will bias the grid 10 of tube A negative beyond the point of cutoff. For this condition the plate 6 of tube A draws no plate current and the grid bias of tube B is such as to allow plate current to flow. This flow of plate current actuates a ballistic galvanometer G. The period of galvanometer G may be made quite long so as to make the reading a fairly steady indication of average percentage "mark." The calibration of the system will be determined by the amount of plate current drawn by tube B for "mark," and by the value of the resistor $R_1$.

This circuit functions the same as the circuit of Fig. 1 to cause tubes B and D to draw plate current whenever a rectified signal above a certain desired level flows through the input resistor. Plate current through tube D causes galvanometer G to read "percent mark." Plate current is at the same time drawn by the plate 9 of tube B. This may be a screen grid tube having the characteristic of drawing constant plate current over a wide range of plate voltage. Hence, voltage drop across capacitor E will increase at a constant rate during the length of time that tube plate 9 of tube B draws plate current. Consequently, the voltage drop across the capacitor E reaches a value proportional to the duration of the "mark" element. The peak values reached for the successive mark elements are currently indicated as moving spots on the cathode ray tube H. At the end of each mark element the charge on the capacitor E is discharged through tube C which is connected so as to become conductive during all "space" elements. The scale on the cathode ray tube may be calibrated to read milliseconds, the sensitivity being governed by the capacitance of the condenser and by the operating constants of tube B.

In the operation of this device and with particular reference to Fig. 2, for a given operating cycle, assuming that a plate voltage of forty-five volts is connected to the plate of tube A, ninety volts for the plate of tube B, and forty-five volts for the plate of tube D, with 100,000 ohms resistance, for the grid of tubes B and D, the signal or false elements are arranged to be received from an antenna by an ordinary receiver 3 which is tuned to substantially the same wave length as the radio channel to be analyzed for determining the best transmission or reception level. When there is no signal or false element received by receiver 3, the grid of tube A is maintained at a zero potential with respect to its cathode. The grids of tubes B and D are maintained at a large negative value of potential with respect to their cathodes. The grid of tube C has a zero potential because there is no current flow at this time through tube D. The upper plate of condenser E is also at zero potential because of the fact that with no signal, tube C acts as a leak and also because at this period of no-signal, no current can pass through tube B due to the large value of negative bias. At the period where there is a signal or false element received in receiver 3, the output from the receiver is rectified by rectifier 4 which is placed in the circuit so as to allow current to flow through resistor 5 in the proper direction to apply a large negative potential with respect to the cathode on grid 10 of tube A. The value of the negative potential on grid 10 of tube A is determined by the strength of signal or false elements and by the setting of the variable arm or potentiometer 5. Because of the negative potential on the grid of tube A, no current will flow in its plate circuit. The grid of tube B is at a small value of negative potential, as is determined by the six-volt battery which is connected in series by the junction point of resistance 7 and the grid of tube B. As the plate voltage supplies for tubes B and D are 90 and 45 volts, respectively, plate current will be drawn, causing galvanometer G to indicate, and because tube B draws current which by reason of screen grid 9a is of a substantially constant rate for a large range of plate voltage as shown by the curve Fig. 5, the total charge on condenser E will be proportional to the length of the time that current is drawn on tube B for any one signal impulse, and thus deflect the beam on cathode ray tube H in amount proportional to the charge on condenser E. The length of time condenser E is permitted to charge will be indicated by the deflection on tube H and consequently the deflection will indicate the duration of the incoming strong signal, or noise. It should be noted that for the duration of the incoming strong signal or noise, tube D will draw plate current which in turn produces a negative bias on tube C sufficient to prevent current to flow in tube C. Hence, tube C is prevented from acting as a conductance. With no antenna input in the absence of signals, because of the current flow in tube A, no current will flow in the plate circuit of tubes B and C. Condenser E discharges through tube C and likewise at this time there is no current flow through galvanometer G due to the absence of plate current flow in tube D. It should be noted that galvanometer G is preferably one with a slow time constant so it in effect will integrate the current pulses to indicate an average value. The one megohm resistor in the grid circuit of tube C is to limit current flow therethrough.

These circuits may be used with an automatic recording instrument. Such combinations may be applied to a variety of research problems. Fig. 3 indicates average results obtained by a group of test runs made with the circuit of Fig. 1 and a recording galvanometer. The antenna used should be a sharply directive one.

By taking "percent mark" readings for various values of receiver sensitivity, the composition of the noise energy may be studied. Fig. 4 represents typical results obtained with a directive antenna on 18 megacycles. It will be noted that only two percent of the time the noise voltage exceeds seven microvolts at the receiver input. The noise voltage was found to exceed 1.5 microvolts thirty-five percent of the time and 1.2 microvolts fifty-five percent of the time. Thus, it will be noted that the curve indicates that signal voltages greater than eight microvolts will be required to obtain a good radio telegraphic channel free from noise under this set of conditions. It was also observed that receiver noise caused some of the "mark" reading observed with a sensitivity of one microvolt.

This invention is not to be limited to the modifications shown but only to such limitations as are clearly imposed by the appended claims; also, the values of voltages and resistances given above are not the only ones which can be used, for it is quite likely that one skilled in the art may make certain adjustments of some of these values to obtain an operative device.

I claim:

1. A circuit having means to indicate excessive disturbance in the atmospheric state of a radio channel comprising an input circuit tuned to the frequency of a radio channel to be analyzed, a first, a second, and a third electron tube, each having at least a grid-cathode circuit and a plate-cathode circuit, a rectifier connected from said signal input circuit to the grid-cathode circuit of said first tube to apply only negative half cycles of signals to said grid, the plate-cathode circuit of said first tube including a source of direct current potential and a resistance serially connected thereto, said resistance being adjacent said cathode, the cathodes of said first and second tubes being connected together, a connection from the grid of said second tube to the end of said resistance adjacent said source of potential whereby current flow through said resistance places a large value of negative potential with respect to the cathode on the grid of said second tube in the absence of signals, said second electron tube also having a screen grid electrode, and means for applying a positive potential to said screen grid with respect to its cathode whereby plate current in said plate-cathode circuit of said second tube is drawn at a constant rate over a wide range of voltages, the plate-cathode circuits of said second and third tubes being connected in series, a condenser connected from the cathode of said third tube to ground to be charged by current flow in the plate circuit of said second tube during the presence of signals, means responsive to signals for causing plate current to flow in the plate circuit of said second tube during presence of signals, said sources of potential for all of said tubes being so proportioned that said second tube draws current during the presence of signal, and said first and third tubes in the absence of signal impulses whereby said condenser is charged during the presence of a signal impulse and discharged in the absence of a signal impulse, and means connected to said condenser to indicate the duration of charge on said condenser.

2. A circuit having means to indicate excessive disturbance in the atmospheric state of a radio channel comprising an input circuit tuned to the frequency of a radio channel to be analyzed, a first, a second, and a third electron tube, each having at least a grid-cathode circuit and a plate-cathode circuit, a rectifier connected from said signal input circuit to the grid-cathode circuit of said first tube to apply only negative half cycles of signals to said grid, the plate-cathode circuit of said first tube including a source of direct current potential and a resistance serially connected thereto, said resistance being adjacent said cathode, the cathodes of said first and second tubes being connected together, a connection from the grid of said second tube to the end of said resistance adjacent said source of potential whereby current flow through said resistance places a large value of negative potential with respect to the cathode on the grid of said second tube in absence of signals, said second electron tube also having a screen grid electrode, and means for applying a positive potential to said screen grid with respect to its cathode whereby plate current in said plate-cathode circuit of said second tube is drawn at a constant rate over a wide range of voltages, the plate-cathode circuits of said second and third tubes being connected in series, a condenser connected from the cathode of said third tube to ground to be charged by current flow in the plate circuit of said second tube during presence of signals, means responsive to signals for causing plate current to flow in the plate circuit of said second tube during presence of signals, said sources of potential for all of said tubes being so proportioned that said second tube draws current during the presence of signal, and said first and third tubes in the absence of signal impulses whereby said condenser is charged during the presence of a signal impulse and discharged in the absence of a signal impulse, and means including a cathode ray tube connected to said condenser to indicate the duration of charge on said condenser.

3. A circuit having means to indicate excessive disturbance in the atmospheric state of a radio channel comprising an input circuit tuned to the frequency of a radio channel to be analyzed, a first, a second, and a third electron tube, each having at least a grid-cathode circuit and a plate-cathode circuit, a rectifier connected from said signal input circuit to the grid-cathode circuit of said first tube to apply only negative half cycles of signals to said grid, the plate-cathode circuit of said first tube including a source of direct current potential and a resistance serially connected thereto, said resistance being adjacent said cathode, the cathodes of said first and second tubes being connected together, a connection from the grid of said second tube to the end of said resistance adjacent said source of potential whereby current flow through said resistance places a large value of negative potential with respect to the cathode on the grid of said second tube in the absence of signals, said second electron tube also having a screen grid electrode, and means for applying a positive potential to said screen grid with respect to its cathode whereby plate current in said plate-cathode circuit of said second tube is drawn at a constant rate over a wide range of voltages, the plate-cathode circuits of said second and third tubes being connected in series, a condenser connected from the cathode of said third tube to ground to be charged by current flow in the plate circuit of said second tube during presence of signals, means responsive to signals for causing plate current to flow in the plate circuit of said second tube during presence of signals, said sources of potential for all of said tubes being so proportioned that said second tube draws current during the presence of signal, and said first and third tubes in the absence of signal impulses whereby said condenser is charged during the presence of a signal impulse and discharged in the absence of a signal impulse, and means including a cathode ray tube having a scale to read milliseconds connected to said condenser to indicate the duration of charge on said condenser.

4. A circuit having means to indicate excessive disturbance in the atmospheric state of a radio channel comprising an input circuit tuned to the frequency of a radio channel to be analyzed, a first, a second, a third and a fourth electron tube, each having at least a grid-cathode circuit and a plate-cathode circuit, a rectifier connected from said signal input circuit to the grid-cathode circuit of said first tube to apply only negative half cycles of signals to said grid, the plate-cathode circuit to said first tube including a source of direct current potential and a resistance serially connected thereto, said resistance being adjacent said cathode, the cathodes of said first and second tubes being connected together, a connection from the grid of said second tube to the end of said resistance adjacent said source of potential whereby current flow through said resistance places a large value of negative potential with respect to the cathode on the grid of said second tube in absence of signals, said second electron tube also having a screen grid electrode, and means for applying a positive potential to said screen grid with respect to its cathode whereby plate current in said plate-cathode circuit of said second tube is drawn at a constant rate over a wide range of voltages, the plate-cathode circuits of said second and third tubes being connected in series, a condenser connected from the cathode of said third tube to ground to be charged by current flow in the plate circuit of said second tube during presence of signals, the grid of said fourth tube being connected to the end of the resistance in the plate-cathode circuit of said first tube adjacent its source of potential, a resistance and a source of potential serially connected in the plate circuit of said fourth tube, the fourth tube plate resistance being adjacent its cathode, a connection from the end of said last named resistance adjacent said source of potential to the grid of said third tube, said sources of potential for all of said tubes being so proportioned that said second and fourth tubes draw current during the presence of signal, and said first and third tubes in the absence of signal impulses whereby said condenser is charged during the presence of a signal impulse and discharged in the absence of a signal impulse, and means connected to said condenser to indicate the duration of charge on said condenser.

5. A circuit having means to indicate excessive disturbance in the atmospheric state of a radio channel comprising an input circuit tuned to the frequency of a radio channel to be analyzed, a first, a second, a third and a fourth electron tube, each having at least a grid-cathode circuit and a plate-cathode circuit, a rectifier connected from said signal input circuit to the grid-cathode circuit of said first tube to apply only negative half cycles of signals to said grid, the plate-cathode circuit of said first tube including a source of direct current potential and a resistance serially connected thereto, said resistance being adjacent said cathode, the cathodes of said first and second tubes being connected together, a connection from the grid of said second tube to the end of said resistance adjacent said source of potential whereby current flow through said resistance places a large value of negative potential with respect to the cathode on the grid of said second tube in absence of signals, said second electron tube also having a screen grid electrode, and means for applying a positive potential to said screen grid with respect to its cathode whereby plate current in said plate-cathode circuit of said second tube is drawn at a constant rate over a wide range of voltages, the plate-cathode circuits of said second and third tubes being connected in series, a condenser connected from the cathode of said third tube to ground to be charged by current flow in the plate circuit of said second tube during presence of signals, the grid of said fourth tube being connected to the end of the resistance in the plate-cathode circuit of said first tube adjacent its source of potential, a resistance and a source of potential serially connected in the plate circuit of said fourth tube, the fourth tube plate resistance being adjacent its cathode, a connection from the end of said last named resistance adjacent said source of potential to the grid of said third tube, said sources of potential for all of said tubes being so proportioned that said second and fourth tubes draw current during the presence of signal, and said first and third tubes in the absence of signal impulses whereby said condenser is charged during the presence of a signal impulse and discharged in the absence of a signal impulse, means connected to said condenser to indicate the duration of charge on said condenser, and a second indicating means comprising a galvanometer connected in the plate circuit of said fourth tube.

HAROLD O. PETERSON.